(12) United States Patent
Schmitt et al.

(10) Patent No.: US 6,938,442 B1
(45) Date of Patent: Sep. 6, 2005

(54) METHOD FOR ELONGATING A CYLINDER OF SILICA GLASS

(75) Inventors: Clemens Schmitt, Blankenbach (DE); Karsten Bräuer, Bruchköbel (DE); Uwe Christiansen, Gelnhausen (DE); Rainer Köppler, Seligenstadt (DE); Heinz Fabian, Grossotheim (DE)

(73) Assignee: Heraeus Tenevo GmbH, Hanau (DE)

(*) Notice: Subject to any disclaimer, the term of this patent is extended or adjusted under 35 U.S.C. 154(b) by 0 days.

(21) Appl. No.: 09/958,245

(22) PCT Filed: Mar. 22, 2000

(86) PCT No.: PCT/EP00/02506

§ 371 (c)(1),
(2), (4) Date: Oct. 5, 2001

(87) PCT Pub. No.: WO00/61509

PCT Pub. Date: Oct. 19, 2000

(30) Foreign Application Priority Data

Apr. 7, 1999 (DE) .............................. 199 15 509

(51) Int. Cl.[7] .......................................... C03B 37/012
(52) U.S. Cl. ........................ 65/381; 65/382; 65/377; 65/404; 65/29.14; 65/283
(58) Field of Search ................... 65/477, 534, 535, 65/537, 533, 381, 382, 377, 404, 29.14, 283

(56) References Cited

U.S. PATENT DOCUMENTS

| 2,155,131 A | 4/1939 | Hanlein |
| 2,306,995 A | 12/1942 | Palmer et al. |
| 3,401,028 A | 9/1968 | Morrill, Jr. |

(Continued)

FOREIGN PATENT DOCUMENTS

| DE | 39 29 894 | * 3/1991 | .................. 65/533 |
| EP | 0 578 244 A1 | 1/1994 | |
| EP | 0 846 665 A2 | 6/1998 | |
| EP | 0 846 665 A3 | 1/1999 | |

OTHER PUBLICATIONS

Abstract of DE 39 29 894 Mar. 1991.*

Primary Examiner—John Hoffmann
(74) Attorney, Agent, or Firm—Tiajoloff & Kelly

(57) ABSTRACT

According to a prior art method for producing a cylindrical component comprised of silica glass, a cylinder comprised of a softened silica glass mass is drawn in a predetermined drawing direction along a drawing axis by means of a drawing device which acts upon said cylinder. The aim of the invention is to provide a method which prevents, to the greatest possible extent, warping of the drawn cylinder and other deviations from the ideal cylinder dimensions and to prevent, to the greatest possible extent, the outer surface of the drawn cylinder from being touched. To these ends, the invention provides that the drawing device comprises a plurality of guide elements which are arranged one behind the other along the drawing axis, and which can be displaced independently of one another in a drawing direction and in a direction opposite thereto. At least two of said guide elements which maintain an engaging distance from one another are simultaneously displaced, in a frictionally engaged manner, on the cylinder in a drawing direction and with an identical drawing speed. A device suited for carrying out the inventive method comprises a feed device, a heating zone and a drawing device by means of which a cylinder is drawn along a drawing axis and in a predetermined drawing direction with a controlled drawing speed. The drawing device comprises a number of drawing elements which are arranged one behind the other along the drawing axis and which can be displaced independently of one another in a drawing direction and in a direction opposite thereto.

5 Claims, 1 Drawing Sheet

U.S. PATENT DOCUMENTS

Figure 1:
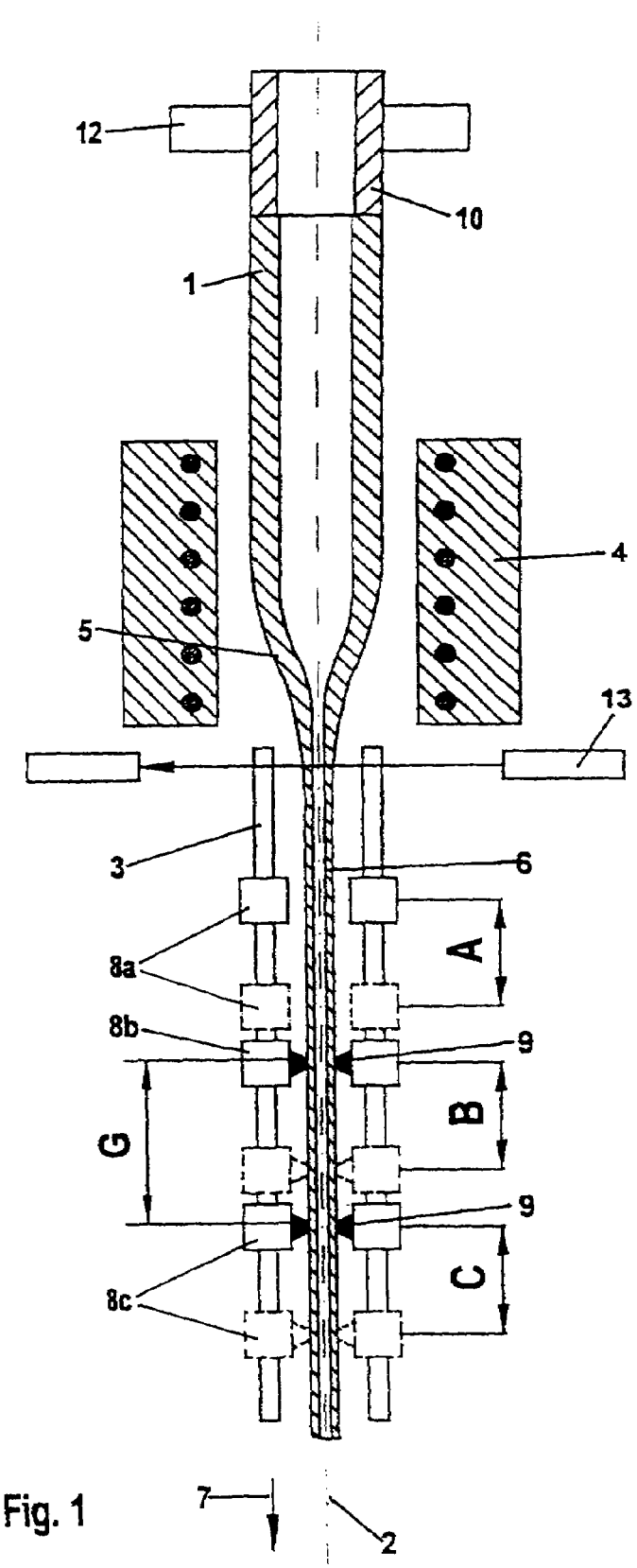

| | | | |
|---|---|---|---|
| 4,121,920 A * | 10/1978 | Balkwill | 65/534 |
| 4,407,667 A * | 10/1983 | Le Noane et al. | 65/407 |
| 4,552,576 A * | 11/1985 | Hara et al. | 65/378 |
| 4,704,151 A * | 11/1987 | Keck | 65/402 |
| 5,364,432 A * | 11/1994 | Leber | 65/17.3 |
| 5,674,306 A * | 10/1997 | Hoshino et al. | 65/385 |
| 5,942,019 A * | 8/1999 | Saito et al. | 65/382 |
| 6,178,778 B1 * | 1/2001 | Kenmochi et al. | 65/381 |
| 6,279,353 B1 * | 8/2001 | Wada et al. | 65/407 |
| 6,532,776 B1 * | 3/2003 | Suzuki et al. | 65/404 |
| 6,742,363 B1 * | 6/2004 | Yamamura et al. | 65/377 |

* cited by examiner

METHOD FOR ELONGATING A CYLINDER OF SILICA GLASS

The invention relates to a process for the production of a cylindrical component of quartz glass by drawing a cylinder from a softened quartz glass mass in a predetermined drawing direction along a drawing axis by a drawing means engaging the cylinder.

Furthermore, the invention relates to a device for producing a cylindrical component of quartz glass by drawing a cylinder from a softened quartz glass mass, with a supply means, a heating zone and a drawing means, whereby a quartz glass raw material is supplied to the heating zone via the supply means, the quartz glass raw material being softened in the heating zone to form the quartz glass mass, and the cylinder being drawn from the softened quartz glass mass by the drawing means, along a drawing axis, in a predetermined drawing direction and at a controlled drawing rate.

A cylindrical component of this kind may be for example a tube, a capillary or a rod. The component is obtained from the drawn cylinder after additional processing steps such as for example elongation. The quartz glass mass may be softened in a crucible or it may be provided as a formed body, such as for example a cylinder delivered to the heating zone and gradually softened therein.

A process and a device of the above described kind are known from EP A2 598 349 which concerns a process for producing a large-volume quartz glass preform for optical fibers in a so-called rod-in-tube process. In a process step for producing the preform a hollow quartz glass cylinder is elongated into a quartz glass tube of predetermined dimensions. The hollow quartz glass cylinder is disposed vertically and is continuously fed into an electrically heated furnace where it is gradually softened, beginning at the lower end. A quartz glass tube is continuously drawn downward from the softened zone, with the drawing axis corresponding to the longitudinal axes of the hollow cylinder and the tube. The drawing means used for the drawing of the tube is comprised of a pair of opposed rollers with two counter-rotating rollers in contact with the outer surface of the tube.

The VDI-Zeitschrift [Journal of the Association of German Engineers] vol. 85, No. 49/50, pgs. 958–959, describes a process for producing quartz glass tubes for lamps wherein the tube is drawn vertically downward through a discharge orifice from a crucible holding a softened quartz glass mass. The drawing means employed there provides counter-rotating pull-chains extending parallel to the tube to be drawn. The pull-chains are provided with springably mounted pull jaws engaging the tube's outer surface and thereby drawing the tube downward.

Both tubes and rods can be produced by the process mentioned above. Inadequate alignment of the drawing means or unforeseeable changes during the drawing process, for example temperature fluctuations in the region of the softened quartz glass mass, may lead to a displacement of the drawing axis in relation to the vertical, resulting in the bending of tubes or rods being drawn. Deviations from ideal cylindrical form may also result, such as for example an ovalness or an uneven wall thickness distribution in hollow cylinders. Furthermore, the surface over the entire length of the cylinder being drawn is mechanically stressed due to the contact with the roller pair or the pull-chain. The resulting damage can have negative effects during the drawing or during subsequent processing.

The object of the invention is therefore to indicate a process which to the greatest possible degree avoids bending of the cylinder being drawn and other deviations from ideal cylindrical geometry, and to provide a device suitable therefor. Moreover, the object of the invention is to avoid, to the greatest extent possible, any contacting of the surface of the drawn cylinder.

As for the process, the object is achieved according to the invention on the basis of the process described in the foregoing in that the drawing means comprises a plurality of guide elements arranged in series along the drawing axis and movable independently from one another in the drawing direction and in the opposite direction. At least two of the said guide elements frictionally engage the cylinder at the same time and are moved at the same drawing rate in the drawing direction while maintaining a grip distance from one another.

The guide elements engaging the cylinder move synchronously with the cylinder being drawn, at the drawing speed and in the drawing direction. Hereinafter they will be also called "active guide elements." At least two of the active elements frictionally engage the cylinder surface at a locally delimited and defined surface area. The frictional engagement of each of the guide elements with the cylinder is usually achieved in that the guide element grips around the cylinder with such force that the guide element is prevented from slipping off or the cylinder from slipping through. A distance is maintained between adjoining active guide elements which simultaneously engage the cylinder. This distance corresponds to a section of the cylinder and will be described below as the "grip" distance. Contact with the cylinder surface over the length of the grip distance can be avoided.

During the drawing process at least two of the guide elements engage the cylinder at the same time. The serial arrangement of several active guide elements along the drawing axis assures a rigid guiding of the cylinder along a predetermined axis, i.e. the drawing axis. This is independent of changes in the geometry or position of the softened quartz glass mass or fluctuations of the drawing parameters. Hence a tilting of the cylinder away from the predetermined drawing axis and the corresponding deviations from the desired cylinder geometry are avoided.

Each one, or a plurality of, the guide elements is movable along the drawing axis in the drawing direction as well as—independently from one another—in the reverse direction. A given guide element cannot engage the cylinder during the reverse movement phase. Henceforth the guide elements in this movement phase will be also called "passive guide elements." During this movement phase at least two other active guide elements moving synchronously with the cylinder at the drawing speed in the drawing direction must be available in order to ensure rigid guiding of the cylinder. The passive element (or elements) being moved in the reverse direction can be moved to the starting position, or another position, to be then available there for the drawing the cylinder in the drawing direction. This manner of proceeding, hereinafter called "reciprocal drawing," permits continuous drawing of long cylinders; the requisite drawing apparatus is of small height and width.

Ordinarily the drawing axis is vertical, and in the simplest case the cylinder is drawn downward.

However, the drawing axis may also extend horizontally or be inclined relative to the vertical if the distorting effect of gravity is compensated during the drawing by a rotation of the cylinder about its longitudinal axis. To the extent that the invention will be explained below by way of a vertically arranged drawing axis with a downward draw for simplicity's sake, this is done merely to facilitate understanding of the invention and does not exclude other orientations of the drawing axis and drawing direction, unless mentioned specifically.

With respect to the longest possible contactless section of the cylinder, it has been shown to be advantageous when the distance between guide elements engaging the cylinder is at least 1 m. When the distance is large, the guiding of the cylinder by the active guide elements—which assure rigid guiding—is also more precise.

It is particularly advantageous in reciprocal drawing if the grip distances are of equal lengths or represent whole number multiples of a predetermined minimum length. The number of contact points between guide elements and cylinder can be kept low in this process variant by relocating the contact point of a succeeding element as precisely as possible onto the contact point of one or several preceding guide element or elements. When the grip distances between adjoining guide elements are equal, the contactless cylinder section between adjoining contact points corresponds to the grip distance, or to the predetermined minimum distance.

In a particularly successful manner of proceeding, the reverse movement rate of the guide elements is at least twice the drawing rate. The faster the speed of the reverse movement is set, the shorter the time interval can be during which a guide element cannot engage the cylinder because it is being relocated in the direction opposite to the drawing direction. The shortest possible time interval has a positive effect on the stability of the cylinder guiding and on the process stability overall.

In a preferred process variant the guide elements are each assigned to a working zone which corresponds to an individual section along the drawing axis, with the guide elements being moved within their respective working zones in the drawing direction and in the reverse direction. Each one of the guide elements is assigned to an individual section along the drawing axis and is moved within that section independently from the others for the drawing of the cylinder; they do not engage the cylinder during the reverse movement phase. The working zones are usually arranged serially but may also overlap.

It has been shown to be advantageous for the working zones to be shorter by a span than the grip distance, with the ratio of the span to the respective working zone being at least as great as the ratio of the drawing rate to the reverse motion rate. This manner of proceeding should be viewed as meaningful only if the reverse movement rate of the guide elements is at least double the drawing rate, and is particularly advantageous if each of the guide elements is moved within its preset working zone between a preset, constant starting point and a preset, constant terminal point, and if constant grip distances (distance between the contact points) are to be realized at the same time. This requires that beginning at its starting point, each of the guide elements be moved in the drawing direction synchronously with the cylinder only over a partial length of the grip distance, since the "reverse motion phase" for the return of the drawing element to its starting point, and the "stop phase" for a repeat contact of the guide elements with the cylinder, require a finite time interval during which the cylinder is drawn by a further, second partial length. This second partial length corresponds to the section described as the "span." It is advantageous to keep the "span" short since during the "return and stop phase" at least one passive guide element is not engaging the cylinder so that the cylinder guidance must be assured by the remaining active guide elements. A short span is achieved by the shortest possible "return movement phase," i.e. by the highest possible speed of the reverse movement and by the shortest possible "stop phase." This manner of proceeding permits continuous repetition of the same motion sequences with the longest possible intervals for the active guide element and short time intervals for the passive guide elements, and has an especially positive effect on the stability of the process.

It has been shown to be particularly advantageous if each of the respective guide elements engages the surface of the cylinder axisymmetrically in relation to the drawing axis. This facilitates the precise guiding of the cylinder along the drawing axis.

Advantageously, the softened quartz glass mass, the cylinder and the guide elements engaging the cylinder rotate about the drawing axis at the same rotational speed. Any displacement relative to the drawing axis in the drawing direction, ovalness, irregular wall thickness distribution, bending or any temperature fluctuations in the cylinder or softened mass regions can be thus compensated.

Especially advantageous has been the use of a drawing means having at least three guide elements. They permit a reciprocal drawing at low apparatus cost, with a relatively small height of the drawing means employed therefor. At least two of the guide elements contact the cylinder even during the time interval when one of the guide elements is being returned to a starting position or is awaiting application.

In a preferred version of the process according to the invention the cylinder is drawn by elongation from a cylindrical preform of quartz glass whereby the preform is continuously fed to a heating zone, gradually softened therein while forming the softened quartz glass mass, and the cylinder is drawn from the softened region. The preform may be for example a hollow cylinder or a rod. In this manner of proceeding the cross sectional geometry of the cylinder may be maintained especially precisely by controlling the feed rate of the preform and the drawing rate of the cylinder. A high pressure or vacuum may be applied at the bore if a hollow cylindrical preform is used.

As concerns the device for producing a cylindrical component of quartz glass by drawing a cylinder from a softened quartz glass mass, the above-indicated object is achieved according to the invention on the basis of the generic device described initially in that the drawing means comprises a plurality of guide elements arranged serially along the drawing axis and movable independently from one another in the drawing direction and in the reverse direction.

By being displaceable in the drawing direction at the drawing rate, the guide elements engaging the cylinder can be moved synchronously with the cylinder being drawn so that each guide element engages only at a locally delimited and defined region of the cylinder surface. Contact with the cylinder surface in the region between two adjacent guide elements is thus avoidable.

The serial arrangement of a plurality of guide elements engaging the cylinder assures a rigid guiding of the cylinder along a predetermined axis, i.e. the drawing axis. Tilting of the cylinder away from the predetermined drawing axis is thereby avoided.

The greater the distance between those guide elements which assure a rigid guiding, the more precise the guiding of the cylinder by the guide elements. It has been shown to be advantageous if the distance between active guide elements is at least 1 m.

A "reciprocal drawing" as described above is made possible in that the guide elements are also movable independently in the direction counter to the drawing direction.

In a preferred embodiment of the device according to the invention the guide elements are each assigned a working zone corresponding to an individual segment along the drawing axis whereby the guide elements are movable within their respective working zones both in the drawing direction and in the reverse direction. This embodiment permits a continuous drawing of long cylinders while maintaining a relatively low construction height. Each guide element is assigned an individual segment along the drawing axis within which they are movable back and forth independently from one another for the drawing of the cylinder whereby they are not in contact with the cylinder during the movement counter to the drawing direction. The individual working zones and the motion sequence of the guide element can be coordinated so that number of contact points between guide elements and cylinder is as low as possible, by transferring the contact point of a following guide element as precisely as possible onto the contact point of one or more preceding guide element. This manner of proceeding, in which the guide elements maintain a constant "grip distance" from one another, is explained above in more detail by way of the process according to the invention.

It has been show to be particularly advantageous if each of the guide elements engages the cylinder surface axisymmetrically relative to the drawing axis. This makes it possible to design the guide elements such that they each enclose the cylinder axisymmetrically relative to the drawing axis. This facilitates the precise guiding of the cylinder along the drawing axis. In a preferred embodiment of the device according to the invention this is achieved in that the guide elements are provided with at least three grip jaws evenly distributed along the circumference of the cylinder to be drawn.

Advantageously, a rotational device is provided by means of which the softened quartz glass mass, the cylinder and the guide elements are each rotatable about the drawing axis at the same rotational speed. The rotation compensates for deviations of mass or temperature distribution from axial symmetry, or any potential displacement of the drawing direction relative to the drawing axis.

An especially well performing drawing means comprises at least three guide elements. This permits a reciprocal drawing of the cylinder, as described above by way of the process, while keeping the apparatus expenses and the construction dimensions low.

In an alternative and equally preferred embodiment of the device according to the invention the drawing means comprises four guide elements which are movable in pairs in the drawing direction and in the opposite direction. A drawing process is possible by means of this device variant where the two guide element pairs are alternately actively effecting the drawing while the respective other pair is being moved in the opposite direction—for example to its starting position. Furthermore, this variant of the embodiment permits a drawing process in which the segment between two active guide elements is always at least equal to twice the working distance, by alternately assigning the guide elements in the order of their arrangement to the one or the other guide element pair.

Especially with regard to a precise guiding of the cylinder by the guide elements, an advantageous drawing means has been shown to be one comprising at least one common guide rail for the guide elements, extending parallel to the drawing axis. The guide elements may be arranged displaceably on the common guiding rail, for example in form of carriages.

Advantageously, each of the guide elements is provided with its own drive, with the drives being synchronizable with one another. By providing each guide element with its own drive it is possible to set the motion sequence of each guide element independently from the other guide elements. This especially simplifies the control of the back and forth movement during reciprocal drawing. Movement of the active guide elements at equal drawing speeds is assured by the individual drives being synchronizable with one another.

The invention will be explained below by way of an exemplary embodiment and a drawing. The drawing shows in:

FIG. 1, a schematic representation of a process for producing a tube by elongation of a cylinder and a device suitable therefor according to the present invention.

In FIG. 1, the reference numeral 1 denotes a hollow quartz glass cylinder being fed continuously at a controlled feed rate, starting at the bottom end, to a vertically disposed annular furnace 4 and is heated therein to a softening temperature. A tube 6 is drawn continuously and a controlled drawing rate from the softened region which forms into a so-called onion 5; the drawing direction is indicated by the directional arrow 7. The longitudinal axes of cylinder 1 and tube 6 extend along the drawing axis 8.

The drawing means comprises two guide rails 3, arranged parallel to drawing axis 6, with three drawing carriages 8a, 8b, 8c movable on said guide rails. Each of the drawing carriages 8a, 8b, 8c is provided with a holding chuck 9 whose grip jaws are seen in FIG. 1. Each holding chuck 9 comprises three grip jaws distributed evenly about the circumference of the tube 6 and capable of being opened and closed via electrical control. In addition, each of the drawing carriages 8a, 8b, 8c is provided with its own drive (not shown in FIG. 1). In the open state the drawing carriages 8a, 8b, 8c are movable along the guide rails 3 independently from one another—and according to a common preset command—in the drawing direction 7 and in the opposite direction. In the closed state the holding chucks 9 grip the surface of the tube 6 with just enough force to create a frictional connection which permits a drawing of the tube 6 in the drawing direction 7 without a slipping of the jaws on the tube surface.

A dummy cylinder 10, enclosed axially along the drawing axis 2 by a holding means 12, is mounted coaxially at the upper end of the hollow cylinder 1 for its centered holding.

In an alternative embodiment of the device, not shown in the figure, a coaxial arrangement of the hollow cylinder 1 is ensured by self-centering. This is achieved in that mounted coaxially at the upper end of the hollow cylinder 1 is a dummy cylinder whose free end is provided with an outer cone corresponding to an inner cone of the holding means 10.

The hollow cylinder 1 and/or the dummy cylinder 10 is rotatable about the drawing axis 2 by means of the holding device 12. The drawing carriages 8a, 8b and 8c are also rotatable about the drawing axis 2.

A diameter-measuring device 13 is provided below the annular furnace 4 for measuring the outer diameter of the drawn tube 6.

An exemplary embodiment of the process according to the invention will be explained below by way of the device shown in FIG. 1.

In order to carry out the process, a hollow quartz glass cylinder 1 having an outer diameter of 100 mm and an inner diameter of 30 mm is mounted coaxially with the drawing axis 2 by means of the holding device 12. The hollow cylinder 1 is continuously lowered into the annular furnace 4 at a rate of 25 mm/min. The temperature of the annular furnace is set to about 2,200° C. so that the hollow cylinder 1 is softened and a tube 6 with an outer diameter of 50 mm and an inner diameter of 15 mm is continuously drawn from the softened region while forming an onion 5. In order to regulate a constant outer diameter, the latter is continuously measured by means of a diameter-measuring device 13 and the measurement data are supplied to a control means. The regulated variable of the control means is the drawing rate which is about 100 mm/min. The hollow cylinder 1 as well as the drawing carriages 8a, 8b, 8c rotate about the drawing axis 2 at a rate of about 10 RPM during the drawing of the tube 6.

Before the tube 6 is drawn, all drawing carriages 8a, 8b, 8c are arranged in the upper region of the guide rails 3 and the holding chucks 9 are open. After a strand of the softened quartz glass has been introduced through the holding chucks 9 of the three drawing carriages 8a, 8b, 8c the said strand is at first clamped into the lower drawing carriage 8c and pulled down at a pre-calculated rate. A first contact point on the tube surface is produced by the clamping in the lower drawing carriage 8c. Thereafter, the tube 6 is gripped by the central drawing carriage 8b which engages the tube 6 at a grip distance "G" of 2 m from the first contact point and then, beginning at its starting position, draws the tube 6 downward synchronously with the lower drawing carriage 8c.

The tube 6 to be drawn is guided by two of the drawing carriages 8b, 8c, which provides a rigid guiding of the tube 6 in the direction of the drawing axis 2. The fixing in the central drawing carriage 8b provides an additional contact point on the tube surface, separated from the first contact point by the grip distance "G" of 2 m. Once an additional partial length has been drawn—corresponding to the grip distance "G" of 2 m—the upper drawing carriage 8a also grips the tube 6 and, having created a third contact point, commences the drawing whereby its drawing rate is synchronized with the two other drawing carriages 8b, 8c, by means of a common control. Thus all three drawing carriages 8a, 8b, 8c engage the tube 6 at a constant grip distance "G" of 2 m.

Now the drawing process enters a phase where the drawing carriages 8a, 8b, 8c are moved reciprocally upward and downward within their respective working zones A, B, C whereby during the downward movement the tube 6 is fixed in the drawing carriages 8a, 8b, 8c, respectively, and the respective chuck 9 is open during the upward movement. The rate of the upward movement is independent from that of the downward movement (drawing speed). In the exemplary embodiment it is about four times the drawing speed, but it also may be considerably faster. In FIG. 1, the upper positions of the drawing carriages 8a, 8b, 8c in their respective working zones A, B, C are indicated by solid lines while their lower positions are indicated by broken lines.

The working zone A of the upper drawing carriage 8a extends from its starting position for 2 m in the drawing direction 7. The working zone B of the central drawing carriage 8b is between 2.2 m and 4 m, and the working zone C of the lower drawing carriage 8 is between 4.5 m and 6.0 m. As soon as the lower end of the respective working zones A, B, C is reached, the respective drawing carriage is moved back to the starting position of its respective working zone A, B, C and waits there until the adjacent contact point has reached the precise grip distance "G" of 2 m. In order to ensure at all times a sufficient guiding of the tube 6 by at least two of the drawing carriages 8a, 8b, 8c, the "waiting" drawing carriage grips the tube 6 just at (or shortly before) that moment when the other drawing carriage 8a, 8b, 8c releases the tube 6 in order to be returned to its starting position. This manner of proceeding also ensures the maintaining of the predetermined grip distance "G" by the drawing carriages 8a, 8b, 8c so that a contact point created by the drawing carriage 8b or 8c is always reflected precisely to the millimeter at the contact point created by the preceding drawing carriage 8a or 8b, so that contactless tube lengths of 2 m are maintained between the respective contact points.

In the concrete exemplary embodiment, after another length of about 1 m has been drawn, the upper drawing carriage 8a is moved back to the start position of its working zone. After a further length of about 1 m has been drawn, the upper drawing carriage 8a again engages the tube 6 and draws in the drawing direction 7. As soon as the holding chuck 9 of the central drawing carriage 8b opens, the latter is moved to the work zone B starting position. During this movement phase the tube 6 is guided and drawn by the upper drawing carriage 8a and the lower drawing carriage 8c.

After an additional length of about 0.5 m has been drawn, the central drawing carriage 8b again grips the tube 6 and draws in the drawing direction 7; at the same time the holding chuck 9 of the lower drawing carriage 8c opens and the latter is moved to the starting position of the working zone C. During this movement phase the tube 6 is guided and drawn by the upper drawing carriage 8a and the central drawing carriage 8b.

The described motion phases are repeated sequentially a number of times. The drawn tube 6 may be cut to desired dimensions from time to time.

The points of engagement (contact points) created by the holding chucks 9 of the respective drawing carriages 8a, 8b, 8c are in each case precisely superimposed at the grip distance "G" of 2 m. The surface of tube 6 within the grip distance "G" is therefore not affected in any way by the drawing.

What is claimed is:

1. A process for producing a cylindrical component of quartz glass, said process comprising:
   drawing a cylinder from a softened quartz glass mass in a predetermined drawing direction along a drawing axis by a drawing apparatus engaging the cylinder;
   said drawing being at a drawing rate;
   the drawing apparatus comprising at least three guide elements arranged serially along the drawing axis and each being supported by a movable support for reciprocal movement in the drawing apparatus in the drawing direction and in an opposite direction, wherein the movable supports are such that each of said guide elements can be moved in said reciprocal movement independently of the other guide elements;
   said guide elements selectively frictionally engaging with the cylinder so as to guide the cylinder and disengaging from the cylinder so as to be able to move relative thereto;
   two of said guide elements simultaneously frictionally engaging the cylinder and maintaining a grip distance therebetween, and being moved at the drawing rate in the drawing direction while a third of said guide elements is disengaged from the cylinder and moved in the opposite direction;
   the guide elements each being associated with a respective working zone that corresponds to an individual segment along the drawing axis, the guide elements moving within their respective working zones in the drawing direction and in the opposite direction;
   wherein the guide elements move in the opposite direction at a reverse movement rate that is at least twice the drawing rate, the working zones being shorter than the grip distance by a distance, and the ratio of the distance to the length of the respective working zone being at least as great as the ratio of the drawing rate to the reverse movement rate.

2. A process according to claim 1, wherein the grip distance is at least in between the two guide elements.

3. A process according to claim 1 wherein the grip distance between adjacent guide elements is adjusted to a predetermined minimum length or to a length equal to a whole number multiple thereof.

4. A process according to claim 1 wherein each of the guide elements engage the cylinder surface of the cylinder axisymmetrically relative to the drawing axis.

5. A process according to claim 1 wherein the softened quartz glass mass, the cylinder and the guide elements engaging the cylinder all rotate at a single rotational speed.

* * * * *